United States Patent
De Petris et al.

(10) Patent No.: US 8,442,236 B2
(45) Date of Patent: May 14, 2013

(54) METHOD FOR COMMUNICATING ENTITLEMENT DATA FROM A SERVER, RELATED SERVER, CLIENT SYSTEMS AND COMPUTER PROGRAM PRODUCT

(75) Inventors: Gianluca De Petris, Turin (IT); Massimo Balestri, Turin (IT); Barbara Silano, Turin (IT)

(73) Assignee: Telecom Italia S.p.A., Milan (IT)

( * ) Notice: Subject to any disclaimer, the term of this patent is extended or adjusted under 35 U.S.C. 154(b) by 417 days.

(21) Appl. No.: 12/087,220

(22) PCT Filed: Dec. 29, 2005

(86) PCT No.: PCT/EP2005/014101
§ 371 (c)(1),
(2), (4) Date: Sep. 25, 2008

(87) PCT Pub. No.: WO2007/073766
PCT Pub. Date: Jul. 5, 2007

(65) Prior Publication Data
US 2009/0034743 A1    Feb. 5, 2009

(51) Int. Cl.
*H04L 29/06* (2006.01)
(52) U.S. Cl.
USPC ............................. 380/285; 380/28; 713/170
(58) Field of Classification Search .................. 380/28, 380/285; 713/170
See application file for complete search history.

(56) References Cited

U.S. PATENT DOCUMENTS

| | | | |
|---|---|---|---|
| 5,661,807 A * | 8/1997 | Guski et al. .................. 713/159 |
| 5,715,403 A | 2/1998 | Stefik | |
| 5,943,422 A | 8/1999 | Van Wie et al. | |
| 6,483,918 B2 * | 11/2002 | Venkatesan et al. ............ 380/28 |
| 6,735,313 B1 | 5/2004 | Bleichenbacher et al. | |
| 6,775,655 B1 | 8/2004 | Peinado et al. | |
| 2003/0159036 A1 | 8/2003 | Walmsley et al. | |
| 2005/0091492 A1 * | 4/2005 | Benson et al. ................ 713/170 |
| 2005/0265555 A1 | 12/2005 | Pippuri | |

FOREIGN PATENT DOCUMENTS

| EP | 1 051 036 A2 | 11/2000 |
| WO | WO 2005/050415 A1 | 6/2005 |

OTHER PUBLICATIONS

"Secure Hash Standard", Federal Information Processing Standards Publication 180-2, pp. 1-24, (2002).
Schneier; "Protocols, Algorthms, and Source Code in C", Applied Cryptography, Second Edition, pp. 1-6 and 429-460, (1996).

* cited by examiner

*Primary Examiner* — Jeffrey Pwu
*Assistant Examiner* — Michael D Anderson
(74) *Attorney, Agent, or Firm* — Finnegan, Henderson, Farabow, Garrett & Dunner, L.L.P.

(57) ABSTRACT

A server communicates a set of entitlement data representative of the entitlement of a client to access corresponding contents data by using a set of keys and a non-invertible cryptographic function. The cryptographic function is applied to a set of candidate bit strings using the set of keys to find a selected bit string that produces the set of entitlement data as a result of the application of the non-invertible cryptographic function by using the keys in the set. The server and the client share the cryptographic function as well as the set of keys (or the selected bit string). The server transmits to the client the selected bit string (or the set of keys). In either case, the client is thus in a position to apply the cryptographic function to the selected string of bits by using the set of keys, thereby reconstructing the set of entitlement data.

17 Claims, 4 Drawing Sheets

METHOD FOR COMMUNICATING ENTITLEMENT DATA FROM A SERVER, RELATED SERVER, CLIENT SYSTEMS AND COMPUTER PROGRAM PRODUCT

CROSS REFERENCE TO RELATED APPLICATION

This application is a national phase application based on PCT/EP2005/014101, filed Dec. 29, 2005.

FIELD OF THE INVENTION

The present invention relates to techniques for communicating entitlement data.

The invention was made with specific attention paid to its possible application to expressing so-called digital rights.

DESCRIPTION OF THE RELATED ART

So-called digital rights, namely the rights related to digital goods, are typically expressed by resorting to languages based on generative grammars of the context-free or context-sensitive type. These languages are called Rights Expression Languages (RELs) and are used to express the rights to use a digital good granted to a user by a Right Issuer (RI). These rights are typically termed a "license" or Rights Object (RO) and are typically represented in an XML (extended Markup Language) format.

All these techniques fall under the general designation of Digital Rights Management (DRM) techniques.

The arrangement disclosed in U.S. Pat. No. 5,715,403 is exemplary of a method of describing a user's rights by means of a grammar, wherein a grammar is a convenient tool for defining valid sequence of symbols for a language, including for example particular notations to indicate distinct choices among alternatives, to group items together in lists, to indicate a variable length list, to indicate time, etc. In particular, the grammar allows creating instances of usage rights indicating a manner by which a possessor of an associated digital work is able to use such work, and further specifies a default plurality of conditions for an instance of a usage right, which must be satisfied before the usage right are exercised. In the arrangement described in U.S. Pat. No. 5,943,422 users' rights are associated to corresponding contents by inserting therein a non-erasable signal which is essentially invisible to the contents.

U.S. Pat. No. 6,775,655 discloses a full Digital Right Management (DRM) system wherein a decryption key is obtained from the license itself. No specific indication is provided concerning the way users' rights are specified.

NIST Federal Information Processing Standard Publications (FIPS) 180-2 "Secure hash standard", 1 Aug. 2002, pages 3-24, specifies four types of secure hash algorithms, namely SHA-1, SHA-256, SHA-384 and SHA-512. These non-invertible cryptographic functions may be advantageously applied within the context of the present invention. Non-invertible functions are functions that can be mathematically formulated but there is no possibility to get an algebraic solution of the inverse. An example is a hash function, which transforms a (large and not fixed) number of bytes in a (small) fixed number of bytes. If for example a hash function H is used to transform a phrase P, composed of an original string of bytes with any size, into a digest D with fixed size, according to the equation $D=H(P)$, because of the non-invertibility of the function H there can be many different P (maybe with different size) that correspond to the same D.

The text by Bruce Schneier: "Applied cryptography: Protocols, Algorithms, and Source Code in C, Second Edition", John Wiley & Sons, 1996, pp. 429-460, provides both theoretical and practical descriptions of cryptography and applications thereof including the possible use of non-invertible cryptographic functions. The bibliographic data provided therein give additional indications as to further cryptographic functions adapted for use within the context of the present invention.

Finally U.S. Pat. No. 6,735,313 (to which EP-A-1 051 036 corresponds) describes the possible use of hash functions to derive decryption keys for certain contents.

OBJECT AND SUMMARY OF THE INVENTION

Conventional DRM systems used for protecting generic digital objects (for instance images, music, various types of programs and so on) typically require the source of the contents (namely the entity that creates or distributes certain data contents) to decide the rights to be given to the user or client (e.g. "This song may be played three times until Jan. 1, 2006"). These rights are not expressed in a natural language but rather resorting to certain languages such as Rights Expression Languages (RELs) that can be easily interpreted by the computer.

While a number of the prior art arrangements considered in the foregoing provide viable solutions to the problem of communicating to a user entitlement data (i.e. data expressing the ability for a user to access certain digital goods), the need is still felt for improved arrangements that may be particularly adapted to those contexts of use where entitlement data must be communicated in a simple and a reliable manner from a "server" to one or more "clients", these clients being typically a high number of clients.

The Applicant has found that the requirements to be preferably fulfilled by such an improved arrangement include the following:

- the rights should be expressed by avoiding the use of a grammar wherein the set of predicates expressing the rights must be transmitted from the server to the clients;
- the enablement message (typically a string of bits) transmitted from the server to the client(s) should be open to reconstruction by the client only on the basis of a "secret" (for instance a set of keys) shared between the server and the client;
- each right should be checked independently from the others without having to perform parsing of any previous rights;
- while no specific limitations generally exist for processing time on the server side, processing time on the client side should be reduced by making it possible to check each and every right by using hardware accelerators of the type currently used in cryptographic or DRM systems;
- each right should be preferably stored in small memory area while also requiring a small bandwidth to be transmitted; and
- the provider of the digital good should preferably be in position to decide if and to what extent calculation (i.e. construction) of an entitlement right should be made difficult with the ensuing possibility of creating a computational barrier against possible forging of data.

The object of the present invention is to provide a response to the needs outlined in the foregoing.

According to the present invention, that objective is achieved by means of a method having the features set forth in the claims that follow. The invention also relates to a corresponding server system, a related client system as well as a related computer program product, loadable in the memory of at least one computer and including software code portions for performing the steps of the method of the invention when the product is run on a computer. As used herein, reference to such a computer program product is intended to be equivalent to reference to a computer-readable medium containing instructions for controlling a computer system to coordinate the performance of the method of the invention. Reference to "at least one computer" is evidently intended to highlight the possibility for the present invention to be implemented in a distributed/modular fashion.

The claims are an integral part of the disclosure of the invention provided herein.

In particular, the Applicant has found that the above objective can be achieved by preliminary sharing between the server and the client a non-invertible cryptographic function and either a string of bits as defined below or a set of keys, and by transmitting from the server to the client, without using any grammar, either the bit string (if the keys have been shared) or the keys (if the string of bits has been shared). The bit string is determined by the server so as to produce the desired entitlement data as a result of said non-invertible function being applied to the string of bits by using the set of keys. The main effort is supported by the server to determine the string of bits, while the client can recontruct the entitlement data very easily by applying again the non-invertible function.

As will be described in greater detail below, a particularly preferred embodiment of the arrangement described herein is based on the concept of assigning "true" or "false" values to an ordered set of first-order predicates that express the entitlement data and limitations that are typical of usage licenses of digital goods. The set of predicates is pre-determined and, as a consequence, does not require to be transmitted from the server to the client(s).

According to a first aspect thereof, the present invention thus relates to a method of communicating from a server a set of entitlement data representative of the entitlement of at least one client to access corresponding contents data, the method including the steps of:

providing with the server a set of keys, a non-invertible function, and a bit string that produces the set of entitlement data as a result of the non-invertible function being applied to the selected string of bits by using said set of keys, causing the server (RI) and the at least one client (U) to share the non-invertible function and one of the set of keys and the selected bit string, and transmitting from the server (RI) the other of the set of keys and the selected bit string.

Preferably, the non-invertible function is a non-invertible cryptographic function.

The method preferably comprises selecting the string of bit out of a set of candidate bit strings.

The method may further include the steps of:
causing the server and the at least one client to, share the non-invertible function and the set of keys, and
transmitting from the server the bit string.

The non-invertible function preferably has a uniform distribution of outputs as a function of its inputs.

Moreover, the non-invertible function is preferably a Message Authentication Code (MAC) function.

In particular, the non-invertible function may be a HMAC-x function where x is selected out of the group consisting of:
HAVAL,
MD2, MD4, MD5,
N-Hash,
RIPEMD (RIPEMD-128, RIPEMD-160, RIPEMD-256, RIPEMD-3U),
SHA (SHA-0), SHA-1 and SHA-2 (SHA-256, SHA-384, SHA-512),
Snefru, Snefru-2
Tiger,
Whirlpool, Whirlpool-0
GOST-Hash,
HAS-160, HAS-V,
Panama,
MGF1.

Preferably, the non-invertible function is selected out of the group consisting of HMAC-SHA-1 and HMAC-MD5.

Preferably, providing a set of keys includes the steps of:
trying different keys until a set of keys producing the set of entitlement data as a result of the non-invertible function being applied to the string of bits by using the set of keys is found.

When the string of bit is selected out from a set of candidate bit strings, the method may include the steps of:
orderly selecting the keys in the set of keys,
subsequently using each key orderly selected in the set of keys for applying the non-invertible cryptographic function to newly generated candidate bit strings in the set of candidate bit strings.

The method may further include the steps of:
partitioning the set of entitlement data into at least a first and a second subset of entitlement data,
applying the non-invertible function and the keys of the set of keys to the at least a first and a second subset of entitlement data to produce at least a first and a second bit string that respectively produce the at least a first and a second subset of entitlement data as a result of the non-invertible cryptographic function being applied to the at least a first and a second bit string by using the set of keys, whereby the set of entitlement data is expressed by the concatenation of the at least a first and a second bit string.

The at least a first and a second subset of entitlement data may include the same amount of entitlement data.

The method may also include the steps of:
receiving at the client the other of the set of keys and the bit string, and
applying the cryptographic function to the string of bits by using the set of keys, thereby reconstructing at the client the set entitlement data.

Furthermore, the method may include the steps of:
the server associating with the entitlement data parametric values expressing conditions for access by the at least one client to corresponding contents data, and
the client associating such parametric values to the entitlement data in the set as reconstructed at the client as a function of the order in which the corresponding bits are included in the string of bits.

The present invention also relates to a server system for communicating, according to the method previously described, a set of entitlement data representative of the entitlement of at least one client to access corresponding contents data, the server system being configured for sharing with the at least one client the non-invertible function and one of the set of keys and the bit string and for transmitting to the at least one client the other of the set of keys and the bit string.

The server system may be implemented as a special purpose hardware processor configured for applying the non-invertible function to string of bits by using the set of keys.

According to a further aspect thereof, the present invention relates to a client system co-operable with the above server system, wherein the client system is configured for:

receiving from the server system the other of the set of keys and the bit string, and applying the non-invertible function to the string of bits by using the set of keys, thereby reconstructing the set entitlement data.

Finally, the present invention relates to a computer program product, loadable in the memory of at least one computer and including software code portions for performing the steps of the method previously described.

BRIEF DESCRIPTION OF THE ANNEXED REPRESENTATIONS

The invention will now be described, by way of example only, by referring to the enclosed figures of drawing, wherein.

DETAILED DESCRIPTION OF PREFERRED EMBODIMENTS OF THE INVENTION

The arrangement described herein is based on the use of non-invertible cryptographic functions to generate and check entitlement data, that is data that represent the ability of a certain user to access (that is to transmit, read, exploit, process and so on) corresponding contents data.

Figure 1:
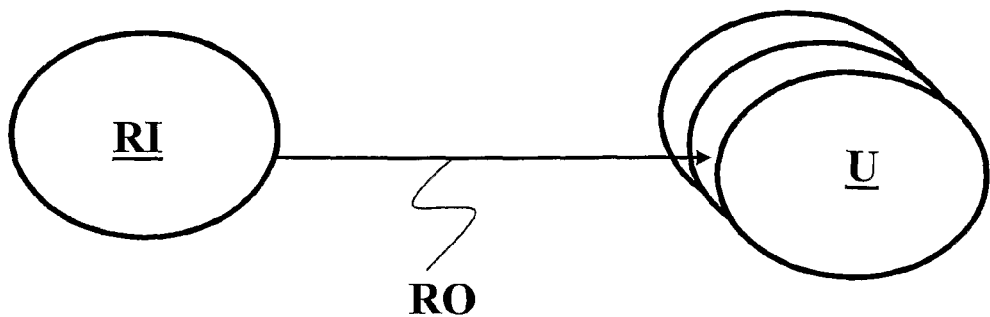
FIG. 1 is generally illustrative of the context of use of the invention.

Essentially, a Rights Issuer, indicated as RI in the diagram of FIG. 1, namely the party granting the rights, sends a Rights Object RO, such as e.g. a bit string S of arbitrary length, to one or more potential users U.

In other words, the Rights Issuer RI (hereinafter the "server") is to communicate to each user U (hereinafter the "client") entitlement data that represent the entitlement for each client U to access (that is e.g. play, execute, record, export, transmit in any form and so on) corresponding contents data such as data representative of a piece of music and so on.

While a single client U will be referred to throughout the description for the sake of simplicity, those of skill in the art will appreciate that the arrangement described herein can be easily extended to scenarios including a plurality of clients U (and a plurality of servers RI).

The server RI and the (or each) client U will also share a set K of n secret keys $k_1, k_2, \ldots, k_n$, one for each right to be represented, as well as a specific non-invertible cryptographic function f. It will be assumed that the rights are expressed by a set P of predicates $p_1, p_2, \ldots, p_n$ (the number of keys being the same of the number of predicates).

Any non-invertible cryptographic function is adapted for use within the framework of the arrangement described herein. Exemplary of such non-invertible cryptographic functions are e.g. HMAC-x functions where x is a hash function, such as:

HAVAL,
MD2, MD4, MD5,
N-Hash,
RIPEMD (RIPEMD-128, RIPEMD-160, RIPEMD-256, RIPEMD-3U),
SHA (SHA-0), SHA-1 and SHA-2 (SHA-256, SHA-384, SHA-512),
Snefru, Snefru-2
Tiger,
Whirlpool, Whirlpool-0
GOST-Hash,
HAS-160, HAS-V,
Panama,
MGF1.

HMAC-MD5 and HMAC-SHA1 currently represent preferred choices. All the previous functions yield results composed from a certain number of bits, while in the present invention it is required just one bit, to represent a true/false value. Therefore a mapping function between the hash result and a single true/false value is needed.

In a preferred embodiment of the arrangement described herein the server RI and the client U share a transformation function T that is adapted to extract a single bit out of an arbitrary long sequence of bits X.

Such function T must essentially satisfy three requirements:

it must be deterministic;

it must depend in certain way from each bit of the sequence X;

it should preferably provide zero or one as output results with the same probability (namely ½ or 50%).

An example of the function T having such features is the exclusive-OR (XOR) function of each bit in the sequence X.

The combination of the HMAC-x function (H) and the said mapping function (T) in the following is referred to as function f, i.e. $f(k_i, S) = T(H(k_i, S))$.

This function f can be defined a priori for the whole life of the system. Otherwise, it can be negotiated between the client U and the server RI. For the sake of completeness one might also consider the "degenerate" case wherein all these entities are known a priori to the client U, whereby such a client U is always enabled to execute the same set of predicates, granted a priori by the server RI.

The function f uses as a first parameter one of the keys $k_1, k_2, \ldots, k_n$ included in the key set K and as a second parameter the string of bits S.

Given the string S, the server can calculate the keys $k_i$ by varying each $k_i$ until a predetermined output $f(k_i, S)$ is obtained.

Figure 5:
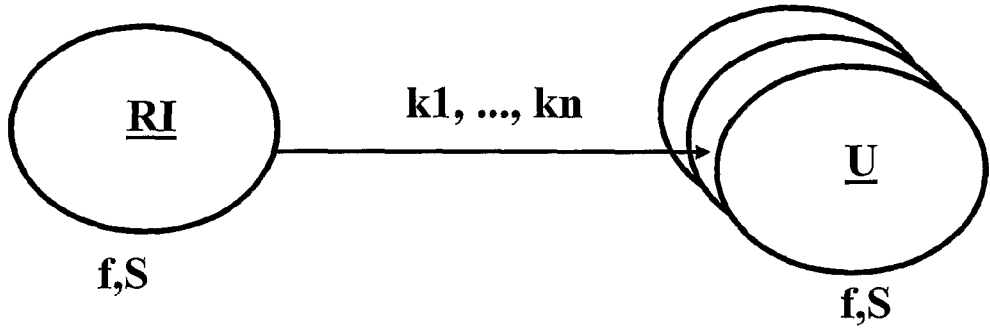
FIGS. 5 and 6 show two possible ways of transmitting the enablement data according to the inventions.
Figure 2:
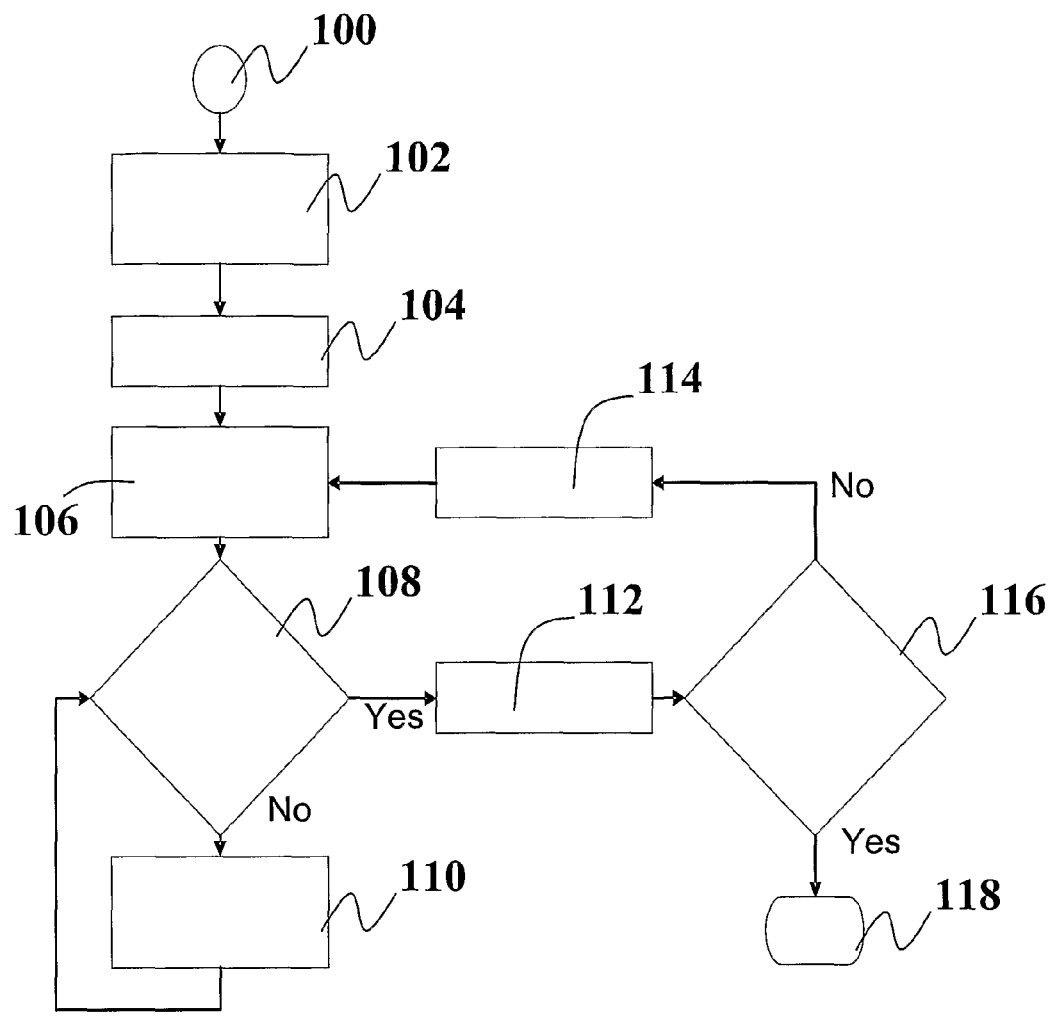
FIG. 2 is a flow chart illustrative of a processing procedure performed within the arrangement described herein.

In the embodiment herein after described with reference to FIG. 2, S is preliminary agreed and shared between server RI and client U (together with function f) and the set of keys $k_1, k_2, \ldots, k_n$ and the rights are transmitted from RI to U by sending the keys $k_1, k_2, \ldots, k_n$ (instead of the predicates $p_1, p_2, \ldots, p_n$), as shown in FIG. 5. In detail, by referring to the flow chart of FIG. 2, after a start step 100, in a step 102 the server RI chooses a certain string of bits S (e.g. randomly, or with value 0). The server RI is thus in a position in a step 104 to start orderly generating the set of binary keys $k_i$.

In a step 106 the server RI selects a first key value (e.g. randomly, or with value 0) for $k_i$. In a step 108 the server RI applies the function f to the candidate string previously generated and the selected key and checks whether the result thus obtained corresponds to the entitlement data (predicates) $p_i$ to be transmitted.

If that is not the case (negative output of the step 108) in a step 110 a new key $k_i$ is selected (e.g. randomly, or with value incremented by 1) and the process of applying the function f to the candidate string previously generated is repeated with the newly selected key.

When the step 108 yields a positive outcome, which is indicative of a "good" key ki having been found (step 112), the server RI generates in a step 114 a new index i (i=i+1) in order to go on with the generation of the next ki and the comparison with the next pi.

This occurs after a step 116 wherein a check is made to see if all the keys ki (i ranging from 1 to n) have been already generated.

The sequence of steps described in the foregoing (steps 106 to 112) is repeated until all the keys ki have been generated.

The process is terminated once the step 116 indicates that all the keys ki have been generated, after which the process evolves to a stop state 118.

Provided that the function f is selected as a cryptographic non-invertible function having a uniform distribution of its outputs, a possibility always exists of finding at least one bit string in the set of candidate strings that satisfies the requirement indicated in the foregoing.

In particular, if the function f is selected as a cryptographic non-invertible function having a uniform distribution of its outputs, the probability that the desired result is obtained at each test is ½ at each test and is constant for all the keys ki, whereby the number of steps required for the server RI to locate the "useful" binary string is on the average less than 2n, wherein n is the number of keys in the set of keys. As previously anticipated, this method is used when RI and U share S and f as a secret and want to communicate all the ki keys as a representative of the corresponding entitlement predicates.

Figure 6:
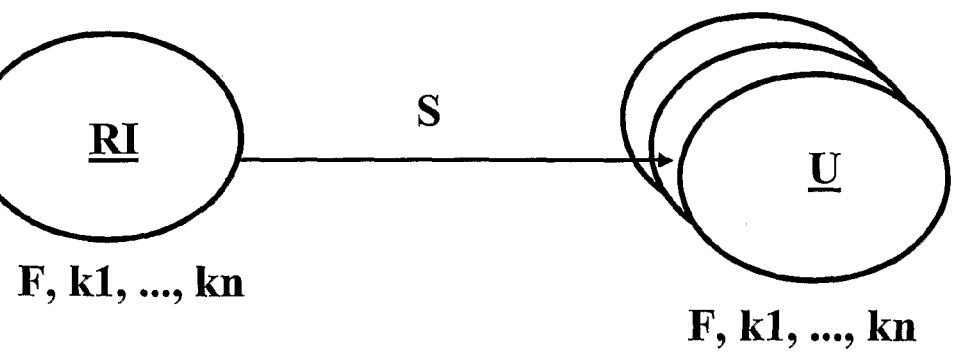

As an alternative, the server RI may proceed by preliminary selecting a given set of keys ki and subsequently applying the function f to such keys to generate the binary string S, which is transmitted to the client U, as shown in FIG. 6. This method is used when the RI and the U share k1, . . . , kn and f as a secret and want to communicate S as a representative of the corresponding entitlement predicates.

Figure 3:
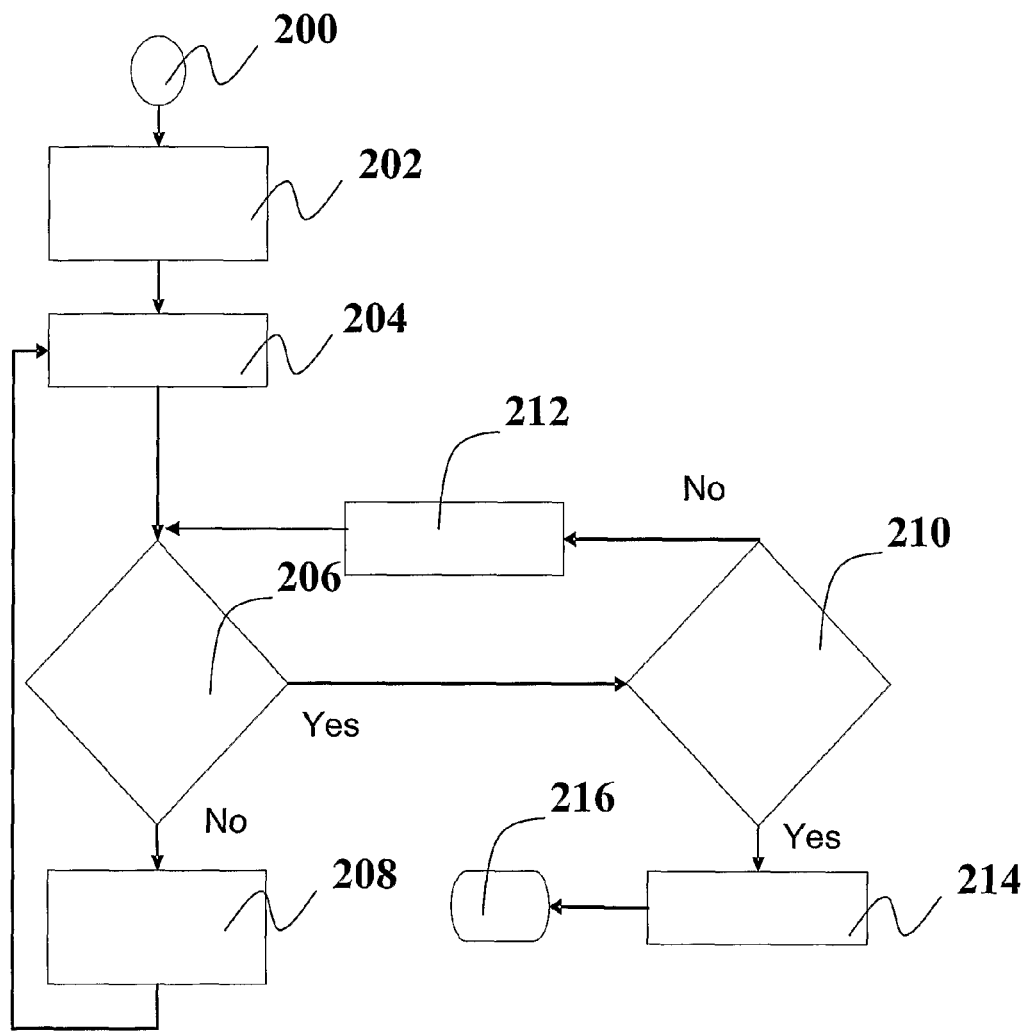
FIG. 3 is a flow chart illustrative of a processing procedure alternative to the processing procedure illustrated by the flow chart of FIG. 2.

This alternative mode of operation is illustrated by the flow chart of FIG. 3.

After a start step 200, in a step 202 the server RI chooses a starting string of bits S and, in a step 204, initializes to 1 the index i of keys ki (i.e., ki is set to k1).

In a step 206 the server RI applies the function f to the candidate string S previously generated and the current key ki and checks whether the result thus obtained corresponds to the entitlement data (predicates) pi to be transmitted.

If that is not the case (negative output from step 206) in a step 208 a new bit string S is generated and the process of applying the function f to the key ki previously generated is repeated with the newly generated bit string.

When the step 206 yields a positive outcome, which is indicative of a "good" string having been found for the current key ki, in a step 212 the server RI increases of one unit the index i of keys ki (i=i+1), in other words selects the next key in the set K. This occurs after a step 210 wherein a check is made as to whether a new key in the set K is available to be selected (i.e. that not all these keys have been tried already).

The sequence of steps described in the foregoing (steps 206 to 212) is repeated with the key selected.

The process is terminated once the step 210 indicates that all the keys in the set K have been successfully tried, after which the selected bit string is stored in a step 214 and the process evolves to a stop state 216.

If the function f is selected as a cryptographic non-invertible function having a uniform distribution of its outputs, the probability that the desired result is obtained is ½ at each test and is constant for all the keys ki, whereby the number of steps required for the server RI to locate the "useful" binary string is on the average of the order of $2^n$, wherein n is the number of keys in the set of keys and the corresponding predicates.

One may thus decide how many steps are to be performed in order to render the process more or less simple to perform from the computational viewpoint. This can be achieved in several ways: by varying the number of predicates (n) contained in the predicate set, or by grouping the n predicates into 2 or more different sets, or by choosing the function f in order to have an output distribution that is not statistically uniform.

For instance, the server RI may proceed by creating two groups or sets including m and n-m rights, respectively (typically with m=n-m=n/2). Once the keys ki are selected, a first string S1 is computed for the first group of rights in a time proportional to $2^m$ and then a second string S2 is computed for the second group of rights in a time proportional to $2^{n-m}$. If m=n/2 the overall time is proportional to $2^{n/2}$. The string expressing the whole of the rights is thus obtained as the concatenation of S1 and S2.

Quite obviously, the server RI and the client U may agree on more than two groups for arranging the rights.

Grouping the rights can therefore make easier to compute S by the server RI.

Figure 4:
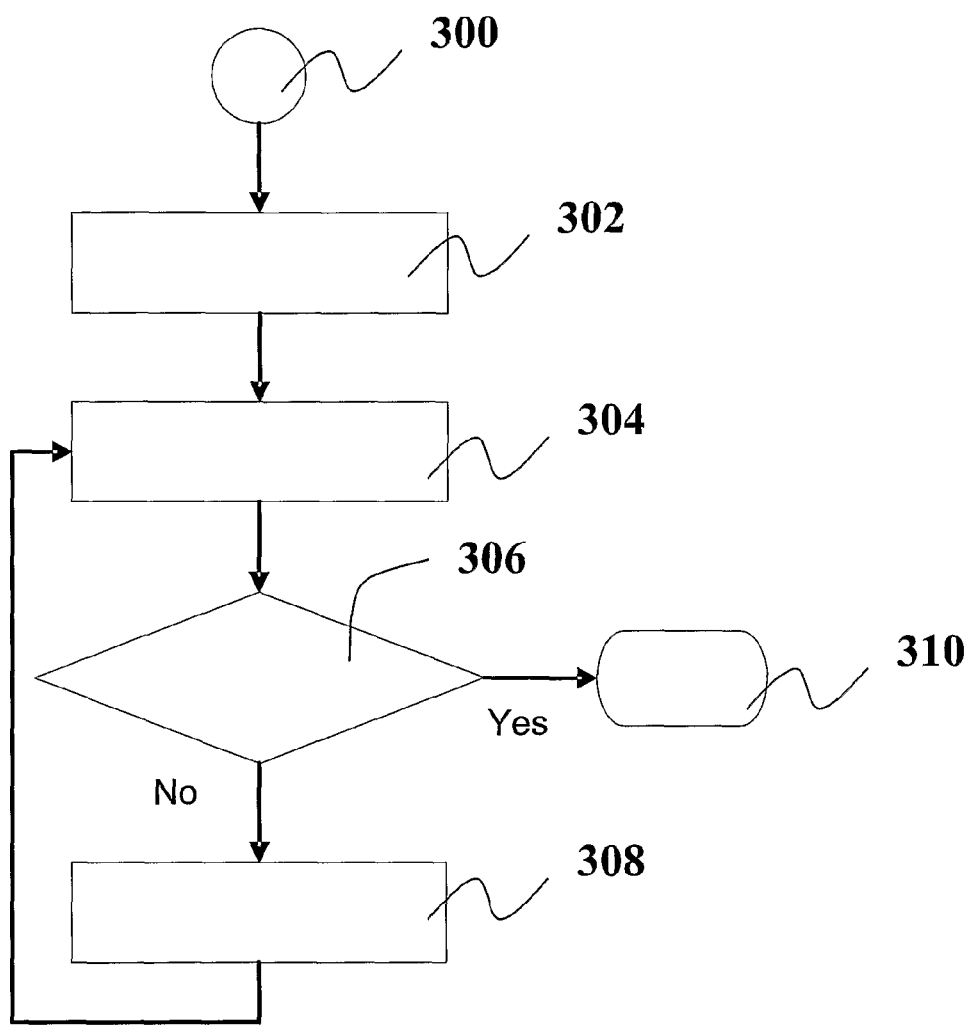
FIG. 4 is a flow chart illustrative of another processing procedure performed within the arrangement described herein.

As illustrated in FIG. 4, the check of rights by the client U is always an immediate one.

When the client U wants to verify whether it possesses a given right (that is a given entitlement data), after a start step 300, in a step 302 the client U initializes to 1 the index i of keys ki of the set K shared with (or received from) the server RI. Then, in a step 304, the client U takes the string of bits received from (or shared with) the server RI and calculates the function f (ki, S) for the first key K1.

The computation of step 304 is then repeated for all the keys in the set K, namely k1, k2, . . . , kn, after having checked that there are other keys to be selected (negative outcome of check step 306) and having then increased of one unit the key index i (step 308)

When the function f has been applied for all the keys (positive outcome of the step 306) the system evolves to a stop 310, which is indicative of the fact that all the entitlement data pi have been read.

The result of this process for each data item/right $p_i$ is a binary value ("0" or "1") that may be conventionally associated with a given meaning, for instance "0"="false" and "1"="true".

That result is used to assign the corresponding meaning to the i-th predicates of the ordered set P of predicates that comprise the pre-established set of all the possible conditions of use of a given digital good. If a "true" value is allotted to a given predicate, the predicate is held to be valid and must be taken into account in verifying the license. If, conversely, the value allotted is "false", the predicate is ignored.

Permission to use a given digital good is given only if at least one true predicate exists that authorises the specific use requested (for instance: "PLAY", "EXECUTE", "RECORD", "EXPORT", and so on) and if all the restrictions applicable thereto (expressed by other true predicate) are satisfied.

For instance a "PLAY" request by a client device made in respect of a given piece of music is satisfied if a true predicate exists stating "you are entitled to execute the PLAY function on that content" and certain restrictive predicate (for instance "you are entitled to play each function only three times") are satisfied.

The entitlement data to be communicated within the context of the arrangement described herein essentially represent a license for use of the contents data protected. In order to avoid improper use, the license is applicable to a given content item and not to other content items. In fact, one purpose of the arrangement described herein is to prevent unlawful large scale distribution of forged rights concerning protected contents.

As detailed in the foregoing, the server RI and the client U share certain basic information in the form of "secret" required to ensure communication between them.

First of all, the server RI and the client U share a function f adapted to perform non-invertible transformation of data sequences by means of a pre-defined set of cryptographic algorithms as described above.

Moreover, the client RI and the server U may share:
- an orderly numerated set of predicates P={p1, p2, ... pn} that comprise the ontology of the possible rights and the related restrictions, possibly expressed by means of parameters whose values can vary for each case (for instance: "the user has the right to perform the "PLAY" operation of the contents", "the "PLAY" right is restricted by the counter x", "the right "PLAY" can be exploited only starting from the date y" and so on);
- a corresponding ordered and numerated set of symmetric cryptographic keys K={k1, k2, ... kn}.

Also in the case of parametric predicates (for instance "the "PLAY" right is restricted by the counter x") the parameter can in turn be expressed by means of set of predicates (for instance p1="the "PLAY" right is restricted by the counter 1", p2="the "PLAY" right is restricted by the counter 2", p1 AND p2=the "PLAY" right is restricted by the counter 3", and so on).

The arrangement previously described herein is therefore a completely general one, in that it lends itself also to transmitting such "parametric" rights.

Further information may be exchanged when the client U starts the communication protocol by requesting from the server RI the right concerning a specific data contents.

Irrespective of the specific format of the data transmitted, the information exchanged between the server RI and the client U during the execution of the protocol may be of the following type (of course the following example is provided only to better illustrate a possible embodiment of the invention and must in no way be construed in a limiting sense of the scope of the invention):
- the client U sends to the server RI a message M requesting a user license concerning a given protected content. The message M indicates the identity of the client U, the identifier of the protected contents for which the user right is requested, the date of the request and the serial number of the request;
- the server RI identifies the client U and then verifies that the client U has the right of being provided a user license in respect of the contents requested. Additionally, the server RI creates that license and transmits it to the client U.

The license is comprised of the combination of various data.

A first set of data includes a set of parametric values V={$v_1$, $v_2$, ... $v_k$} representative of e.g. dates, counters, symbolic identifiers of geographic locations that, when applied to the set of predicates P assign a given value to the set of predicates P thus making it possible to construct each predicate in univocal manner.

The license further includes the string of bits S which, as described in the detail in the foregoing, through the application of a non-invertible cryptographic function f to the string S and a set of keys K={k1, k2, ... kn}, gives rise to a set of n values f($k_i$, S), representative of the entitlement predicates.

The license may possibly include additional data such as a time stamp or a digital signature, adapted to prevent known attacks such as so-called "reply attack" or forging of the license. These additional data and the algorithms possibly related to them are generally of a known type and do not represent essential features of the arrangement described herein, thereby making it unnecessary to provide a more detailed description.

When the client U receives the license, it checks it for authenticity by using cryptographic techniques that are known in the art and do not require to be described in detail herein.

Thereafter (as previously described in connection with FIG. 4), the client U applies to the string S the non-invertible function f by using its own keys K={k1, k2, ... kn} thereby obtaining a numbered and ordered set of binary values B={$b_1$, $b_2$, ... $b_n$}. In mathematical terms, each binary value $b_i$ can be obtained directly from the string of bits S by the following formula:

$$b_i = f(k_i, S).$$

By assigning to each binary value a standard meaning such as e.g. "1"="true" and "0"="false", it is possible to group separately the "true" binary values and the "false" binary values to form a subset of "true" predicates $P_t$ and a subset of "false" predicates $P_f$.

Since the informative content of the false predicates is nil, the whole subset of the false predicates $P_f$ can be ignored. Therefore, the complete semantic content of the license is expressed by the subset $P_t$ only. However, $P_t$ may possibly contain predicates that express conditions related to a parametric value (value, date, and so on).

In that case, in order to obtain a set of predicates adapted to be used as semantic knowledge of the conditions of use of digital good, the client U assigns to each parametric predicate of the set $P_t$ the corresponding value contained in the set V. The association of value and predicate in this case is univocally determined by the order in which the values $v_1$, $v_2$, ... $v_n$ in the set V are transmitted in the license, which corresponds to the order of the predicates in $P_t$ (which is the same as in the set P, by ignoring the predicates included in $P_f$).

At the end of this processing, the client U obtains a set of predicates $P_t(V)$ that expresses the conditions of use of the digital good. Of course, the client is put in a position to construct these conditions and to enforce respect thereof. Additionally, the code itself of the client U must be exempt from vulnerability and must be protected against tampering. These results can be achieved by known means that will not be described in detail herein.

Consequently, in order to generate the binary string S, the server RI must take into account how such a string will be used by the client U to identify $P_t$.

It will be assumed for the sake of simplicity that the server RI imposes such rights to the client U and is in a position to express them in the form of a parametrical subset of P which corresponds to the subset designated $P_t(V)$ in the foregoing.

The ordered set of the parametrical values V is transmitted to the client U without further processing. However, the configuration of $P_t$ is indicated via the following steps.

For each predicate $p_i$ in the ordered set P, if the predicate is present in $P_t$, the value one is assigned to the predicate. Alternatively, if the predicate is absent from $P_t$ the value 0 is assigned thereto. The string of bits thus obtained (that has a length equal to the cardinality of P) forms an ordered set $B(P)=\{b_1, b_2, \ldots b_n\}$.

Subsequently the server RI generates a random string S of arbitrary length. Then the server RI computes (by using the keys K shared with the client U) the ordered set B(S) generated from S by using the formula $b_i=f(k_i, S)$.

The server RI compares B(S) with B(P). If the two ordered sets are identical, the server transmits the string to the client U. Otherwise, computation restarts with the generation of a new random sequence of bits, as described above (FIG. 3).

Since the function f is non-invertible, no other computational scheme exist for determining S other than an approach based on repeated attempts (that is an approach currently referred to as "brute force" computation).

Since the transformation function T is selected in such a way to produce values 0 and 1 as equi-probable outputs each value has a 50% probability to be generated. Consequently, the probability of obtaining exactly the desired sequence of bits $B(P_t)$ is ½ if P includes a single predicate, $(½)^2$ if P contains 2 predicates and in general $(½)^n$ if P contains n predicates.

Consequently, the cardinality of P determines according to an exponential law the computational load associated with calculating B(P).

This fact can be exploited in order to render more difficult, and consequently not advantageous from the economical point of view, the unlawful distribution of forged licenses, even when other security measures have been overcome or defeated.

For instance, by assuming that an acceptable computational time for the generation of a lawful license is of the order of one minute, and by assuming that a possible attacker is in a position to use a server having an equivalent computational power to distribute unlawful licenses, the generation and distribution of a forged license to one million of fraudulent users would require 694 days, that is slightly less than two years. This fact per se is useful to prevent piracy phenomena based on forging of use rights related to given contents.

A further computational barrier can be provided by implementing in hardware those functions required to compute $b_i=f(k_i, S)$, for instance by using a bank of parallel processors configured to explore very rapidly a large set of hypotheses for S. In that case, a "lawful" server RI will have a very strong advantage in terms of computational power, thereby making "pirate" servers implemented in software form practically useless.

However, the arrangement described herein can be implemented also in the form of software code (namely a computer program product) adapted to be executed on general-purpose computers or on dedicate computers.

For instance, the server RI can be implemented in a workstation having access to the Internet in such a way to communicate with the clients U by using a TCP/IP protocol. In that case, the client U can be implemented in the form of a special purpose device, e.g. a digital music player adapted to be connected to the Internet via a Wi-Fi connection.

As an alternative, the server RI and the client U can communicate over a telephone network (both of the fixed and the mobile type) or by using broadcast transmission via satellite, cable or terrestrial broadcasting. In the specific case of broadcast transmission (namely point-to-multipoint-communication) from one server RI to one of the plurality of clients the specific instances of the server RI and the clients U are currently referred to as "head end" (HE) and "set top box" (STB). The arrangement described herein can be applied to the case of broadcast transmission, provided the set of predicates P and the set of keys K are pre-installed in the set top boxes and the head end is aware of the set of keys K installed on each set top box. In that case, the head end can compute for each set top box the string S comprising the user license of a given content (for instance, a program being broadcast at that moment). In the broadcast case, the licenses are generally transmitted before broadcasting the program to which they apply. In fact, the client U will not be generally in a position to request a license at the moment of use.

Another specific case is a client device U comprised of a mobile phone connected to the server RI via a cellular network. In that case, the server RI and the client U can communicate in a bi-directional manner by using a limited bandwidth, and the arrangement described herein has the advantage of exploiting the bandwidth in an extremely efficient manner since the license is represented in a very compact way: the server RI may search for the string S to transmit to the client U among those having a minimum length (compatible with the information entropy of the entitlement data to be transmitted) in order to optimise use of bandwidth.

On the server side, the arrangement described herein can be implemented by using dedicated hardware components for computing the values $f(k_i, S)$. Such a computation can be easily performed in a parallel fashion since the various values $f(k_i, S)$ are independent from each other. A hardware component adapted to compute in parallel all the values for $f(k_i, S)$ could find out the string of bits S adapted to be transmitted and corresponding to the desired sequence of bits for B(P) in much shorter time in comparison with a software implementation, which is linked to a sequential execution of the various processing steps. This may give a significant computational advantage to a hardware server in comparison to possible attackers using software implementations.

As already described in the foregoing, in exchanging information between the server RI and the client U, at least two alternative cases can be considered in so far as computing the function $f(k_i, S)$ is concerned.

In the first place, the server RI and the client U share a fixed value S for each license. The server RI identifies a set of keys K such that $f(k_i, S)=B(P)$ and transmits such keys (in the license) to the client U together with the parametrical values V and other possible data. In that case, the computation complexity is linear and directly proportional to number of keys (and corresponding predicates).

In the second case (which represents the presently preferred embodiment of the arrangement described herein) the server RI and the client U share for each license the keys in the set K (for instance the keys are pre-installed on the client U and are known to the server RI). Consequently, the server determines a string of bits S such that $f(k_i, S)=B(P)$ by varying S until values satisfying the equation is found. In this case the computational complexity is an exponential function of the number of keys. This latter case is preferred in so far as it sets a very high computational barrier required in order to grant (lawfully) licenses while also minimising the quantity of data to be exchanged between the server RI and the client U (in fact, a single string S is sent in the place of n keys).

Other possible variants include the possibility for the server RI and the client U to negotiate which function f is to be used out of a known set previously installed on the respective machines. Alternatively, the possibility exists of downloading in a secure manner from the server RI towards the client U the function f to be used. The same can also be applied to the set of data that are pre-installed on the client U which include a set of predicates P, the keys K and default values for V.

Consequently, without prejudice to the underlying principle of the invention, the details and the embodiments may vary, even significantly, with respect to what has been described by way of example only, without departing from the scope of the invention as defined by the annexed claims.

The invention claimed is:

1. A method of communicating a set of entitlement data from a server to at least one client, the set of entitlement data including a set of predicates representative of entitlement of the at least one client to access corresponding content data stored on the server, comprising the steps of:
    determining a set of keys each corresponding to a predicate in said set of predicates, wherein each key in said set of keys is determined by varying said key and calculating a result of a non-invertible function being applied to a bit until said result is equal to the corresponding predicate;
    causing said server and said at least one client to share said non-invertible function and one of said set of keys and said bit string; and
    transmitting from said server to said at least one client the other remaining one of said set of keys and said selected bit string that is not shared with said at least one client.

2. The method of claim 1, wherein the non-invertible function is a non-invertible cryptographic function.

3. The method of claim 1, comprising selecting said bit string out of a set of candidate bit strings.

4. The method of claim 1, comprising the steps of:
    causing said server and said at least one client to share said non-invertible function and said set of keys; and
    transmitting from said server to the at least one client said bit string.

5. The method of claim 1, wherein said non-invertible function has a uniform distribution of outputs as a function of inputs.

6. The method of claim 1, wherein said non-invertible function is a message authentication code function.

7. The method of claim 6, wherein said non-invertible function is a HMAC-x function where x is selected from the group:
    HAVAL,
    MD2, MD4, MD5,
    N-Hash,
    RIPEMD, RIPEMD-128, RIPEMD-160, RIPEMD-256, RIPEMD-3U,
    SHA, SHA-0, SHA-1 and SHA-2, SHA-256, SHA-384, SHA-512,
    Snefru, Snefru-2
    Tiger,
    Whirlpool, Whirlpool-0
    GOST-Hash,
    HAS-160, HAS-V,
    Panama, and
    MGF1.

8. The method of claim 7, wherein said non-invertible function is selected from the group:
    HMAC-SHA-1 and
    HMAC-MD5.

9. The method of claim 3, comprising the steps of:
    orderly selecting said keys in said set of keys; and
    subsequently using each key orderly selected in said set of keys for applying said non-invertible cryptographic function to newly generated candidate bit strings in said set of candidate bit strings.

10. The method of claim 1, comprising the steps of:
    partitioning said set of entitlement data into at least a first and a second subset of entitlement data; and
    applying said non-invertible function and keys of said set of keys to said at least a first and a second subset of entitlement data to produce at least a first and a second bit string that respectively produce said at least a first and a second subset of entitlement data as a result of a non-invertible cryptographic function being applied to said at least a first and a second bit string by using said set of keys, whereby said set of entitlement data is expressed by the concatenation of said at least a first and a second bit string.

11. The method of claim 10, wherein said at least a first and a second subset of entitlement data comprise the same amount of entitlement data.

12. The method of claim 1, further comprising the steps of:
    receiving at said client the other of said set of keys and said bit string; and
    applying said cryptographic function to said string of bits by using said set of keys, thereby reconstructing at said client said set entitlement data.

13. The method of claim 12, comprising the steps of:
    said server associating with said entitlement data parametric values expressing conditions for access by said at least one client to corresponding contents data; and
    said client associating said parametric values to said entitlement data in said set as reconstructed at said client as a function of the order in which the corresponding bits are in said string of bits.

14. A server system capable of communicating according to the method of claim 1, and comprising a set of entitlement data representative of entitlement of at least one client to access corresponding content data, said server system being configured for sharing with said at least one client a noninvertible function and one of a set of keys and a bit string and for transmitting to said at least one client the remaining one of said set of keys and said bit string that is not shared with said at least one client.

15. The server system of claim 14, wherein said server system is implemented as a special purpose hardware processor configured for applying said non-invertible function to a string of bits by using said set of keys.

16. A client system cooperable with the server system of claim 14, comprising:
    a client system configured for:
    receiving from said server system the other of said set of keys and said bit string; and
    applying said non-invertible function to a string of bits by using said set of keys, thereby reconstructing said set of entitlement data.

17. A non-transitory computer readable medium encoded with a computer program product, loadable into a memory of at least one computer, the computer program product comprising software code portions for performing the method of claim 1.

* * * * *

UNITED STATES PATENT AND TRADEMARK OFFICE
CERTIFICATE OF CORRECTION

| | | |
|---|---|---|
| PATENT NO. | : 8,442,236 B2 | Page 1 of 1 |
| APPLICATION NO. | : 12/087220 | |
| DATED | : May 14, 2013 | |
| INVENTOR(S) | : De Petris et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 621 days.

Signed and Sealed this
Sixteenth Day of December, 2014

Michelle K. Lee
*Deputy Director of the United States Patent and Trademark Office*